UNITED STATES PATENT OFFICE.

EVALD ANDERSON, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS FOR INCREASING THE SOLUBILITY OF POTASH IN CEMENT-KILN DUST.

1,249,708. Specification of Letters Patent. Patented Dec. 11, 1917.

No Drawing. Application filed March 14, 1917. Serial No. 154,765.

*To all whom it may concern:*

Be it known that I, EVALD ANDERSON, a subject of the King of Sweden, and resident of Los Angeles, county of Los Angeles, and State of California, have invented a new and useful Process for Increasing the Solubility of Potash in Cement-Kiln Dust, of which the following is a specification.

The dust collected from the gases passing off from cement kilns has been found in some cases to contain a considerable amount of potash. Under certain conditions, for example, when coal is used as fuel, causing presence of silicious matter in the kiln gases, some of the volatilized potash combines with this silicious matter, forming a difficultly soluble compound. The result is that with potash in this form present in the collected dust, this dust is not rated according to its full potash content as a fertilizer and the recovery of the potash in concentrated form by leaching and evaporation is impracticable, or uneconomical.

The main object of the present invention is to convert any such comparatively insoluble material in the cement kiln dust to a comparatively soluble form. This result is effected according to the present invention by subjecting the dust, containing the potash material partly in insoluble form, to the action of steam, preferably at a pressure in excess of atmospheric pressure.

My process may be carried out as follows:—

The cement kiln dust is placed in a suitable container, preferably of such construction as to enable the condition of pressure to be maintained therein and steam is admitted to such container and the potash containing material is subjected to the action of steam for sufficient time to convert most or all of the potash to water soluble form. I have found that in the case of a cement kiln dust containing six per cent. of potash in water soluble form and four per cent. in water insoluble form that an exposure of the same steam at atmospheric pressure (100° C.) is sufficient to convert all but one per cent. of the potash to water soluble form. The same effect may be obtained in one hour by the exposure of the cement kiln dust to steam at two hundred pounds pressure, the rapidity of the action increasing with the pressure and temperatures of the steam.

After treatment with the steam, the dust may be easily dried, since it absorbs a small percentage of moisture and it may then be used directly as a fertilizer, or it may, if desired, be leached by ordinary means for the purpose of obtaining the potash in a concentrated condition.

What I claim is:

1. The process of increasing the solubility of potash in cement kiln dust, which consists in exposing such dust to the action of steam.

2. The process of increasing the solubility of the potash in cement kiln dust which consists in exposing the dust to the action of steam at a pressure in excess of atmospheric pressure.

3. The process of increasing the solubility of potash in potash-bearing flue dust, which consists in exposing the dust to the action of steam at a temperature above 100° C.

4. The process of recovering potash from cement kiln dust in which some of the potash is in a form difficultly soluble in water, which consists in exposing the dust to the action of steam to convert such difficultly soluble potash to the water soluble form and then leaching the resulting water soluble potash from the dust with water.

In testimony whereof I have hereunto set my hand, at Los Angeles, California, this 2nd day of March, 1917.

EVALD ANDERSON.